(12) United States Patent
Huang et al.

(10) Patent No.: US 7,900,028 B2
(45) Date of Patent: Mar. 1, 2011

(54) METHOD FOR INITIALIZING BUS DEVICE

(75) Inventors: Chung-Ching Huang, Taipei (TW);
Ta-Chuan Liu, Taipei (TW);
Tzu-Chiang Chiu, Taipei (TW);
Chin-Fa Hsiao, Taipei (TW)

(73) Assignee: Via Technologies, Inc., Taipei (TW)

( * ) Notice: Subject to any disclaimer, the term of this patent is extended or adjusted under 35 U.S.C. 154(b) by 1083 days.

(21) Appl. No.: 11/538,693

(22) Filed: Oct. 4, 2006

(65) Prior Publication Data

US 2007/0088879 A1 Apr. 19, 2007

(30) Foreign Application Priority Data

Oct. 7, 2005 (TW) ................................ 94135255 A

(51) Int. Cl.
*G06F 9/00* (2006.01)
*G06F 9/24* (2006.01)
(52) U.S. Cl. ............... 713/1; 713/2; 710/100; 710/110
(58) Field of Classification Search .............. 710/22, 710/100, 110; 713/1, 2; 340/825.52
See application file for complete search history.

(56) References Cited

U.S. PATENT DOCUMENTS

| 4,516,122 A * | 5/1985 | Tomikawa ................ 370/447 |
| 4,727,475 A * | 2/1988 | Kiremidjian ............... 710/104 |
| 4,964,038 A * | 10/1990 | Louis et al. ................. 710/9 |
| 5,996,045 A * | 11/1999 | Lee et al. .................. 711/112 |
| 6,237,113 B1 * | 5/2001 | Daiber ..................... 714/43 |
| 6,256,718 B1 | 7/2001 | Uchida |
| 6,397,280 B1 * | 5/2002 | Nitschke et al. ............. 710/110 |
| 6,771,164 B1 * | 8/2004 | Fink ...................... 340/310.11 |
| 6,993,676 B2 * | 1/2006 | Corbin et al. ................ 714/5 |
| 7,062,644 B2 * | 6/2006 | Bish et al. ................. 713/1 |
| 7,076,585 B2 * | 7/2006 | Tsai ....................... 710/110 |
| 7,221,531 B2 * | 5/2007 | Duerk et al. ................ 360/69 |
| 7,539,206 B2 * | 5/2009 | Ha et al. .................. 370/448 |
| 2004/0024988 A1 * | 2/2004 | Chauvel et al. ............. 712/34 |

(Continued)

FOREIGN PATENT DOCUMENTS

CN 1553338 12/2004

(Continued)

OTHER PUBLICATIONS

"Network Management Protocol of Internet and Application", Oct. 30, 2002, www.cqinc.com.tw/scripts/tornado/marker.exe.

*Primary Examiner* — Thomas Lee
*Assistant Examiner* — Zahid Choudhury
(74) *Attorney, Agent, or Firm* — Kirton & McConkie; Evan R. Witt

(57) ABSTRACT

In a method used for initializing a first bus device and a second bus device sharing a common transmission engine of a bus, a first link of the first bus device and a second link of the second bus device to the common transmission engine are disabled when the computer system is booted. Next, the first link and the second link are enabled in order. Then, a first state updating signal from the first bus device is issued after the first link to the common transmission engine is established. Finally, a second state updating signal from the second bus device is issued after the first state updating signal is received and the second link to the common transmission engine is established.

20 Claims, 4 Drawing Sheets

U.S. PATENT DOCUMENTS

| | | | |
|---|---|---|---|
| 2004/0081179 A1* | 4/2004 | Gregorcyk, Jr. | 370/402 |
| 2004/0117670 A1 | 6/2004 | Kurts | |
| 2004/0123169 A1 | 6/2004 | Elnozahy | |
| 2004/0210681 A1* | 10/2004 | Eschmann et al. | 710/8 |
| 2005/0027900 A1* | 2/2005 | Pettey | 710/22 |
| 2005/0251600 A1* | 11/2005 | Chen | 710/100 |
| 2005/0251674 A1* | 11/2005 | Wang et al. | 713/2 |
| 2006/0149959 A1* | 7/2006 | Rothman et al. | 713/2 |
| 2006/0195842 A1* | 8/2006 | Williams | 718/100 |
| 2007/0005838 A1* | 1/2007 | Chang et al. | 710/62 |
| 2007/0058279 A1* | 3/2007 | Duerk et al. | 360/69 |

FOREIGN PATENT DOCUMENTS

| | | |
|---|---|---|
| TW | 200424858 A | 5/1992 |
| TW | 413989 | 10/1997 |

* cited by examiner

METHOD FOR INITIALIZING BUS DEVICE

FIELD OF THE INVENTION

The present invention relates to a method for initializing a bus device in a computer system, and more particularly to a method for initializing an additional bus device in a personal computer system.

BACKGROUND OF THE INVENTION

A SATA (Serial Advanced Technology Attachment) bus is a new generation of advanced technology attachment (ATA) bus, which is faster in data transmission speed and more efficient in power consumption than the conventional PATA (parallel ATA) bus. Nowadays, the SATA bus is adapted to a high-speed HDD (hard disc drive), and generally works under a scheme as shown in FIG. 1.

In the computer system shown in FIG. 1, the HDD 13 coupled to the SATA bus 12 will actively issue a state updating signal, e.g. a D2H FIS signal, when the computer system is booted. The state updating signal is transmitted through the physical layer device 123, data link layer device 122 and transmission engine 121 of the SATA bus 12, and then sent to the SATA host controller 111 disposed in the core logic chip 11 via the SATA host controller interface 14 to undergo state coordination and state updating operations. After the state coordination/updating operations have been confirmed by the computer system, the HDD 13 completes initialization and starts its normal work.

In a master/slave mode, a transmission engine 121 can be shared by two hard disc drives 23 and 24, as illustrated in FIG. 2, and both hard disc drivers 23 and 24 may issue respective state updating signals (D2H FIS signals) when the computer system is booted. The state updating signals are transmitted to the transmission engine 121 via respective physical layers 123 and 125 and data link layer devices 122 and 124. However, only one of the state updating signals will be acknowledged by the computer system because the transmission engine 121 is generally set to link to only a certain one of the HDDs when the computer system is booted, and thus the operation of the unlinked HDD might have problem. For example, the transmission engine 121 is set to link to the hard disc 23 so as to receive the state updating signal from the HDD 23 via the data link layer device 122 and the physical layer 123 upon the computer system is booted. Therefore, the computer system will respond to the HDD 23 only. On the other hand, the HDD 24, which waits too long for response from the computer system due to failure in transmitting its state updating signal to the transmission engine 121, might not enter the normal operational state. As such, the computer system may crash.

SUMMARY OF THE INVENTION

Therefore, the present invention provides an initializing method capable of initializing the additional HDD.

In an embodiment, the present invention relates to a method for initializing a first bus device and a second bus device sharing a common transmission engine of a bus. The method includes the following steps. At first, a first link of the first bus device and a second link of the second bus device to the common transmission engine are disabled when the computer system is booted. Next, a first state updating signal from the first bus device is issued after the first link to the common transmission engine is established. Finally, a second state updating signal from the second bus device is issued after the first state updating signal is received and the second link to the common transmission engine is established.

The present invention also relates to a method for initializing a plurality of bus devices sharing a common transmission engine of a bus used in a computer system. The method includes the following steps. At first, all the links of the bus devices to the common transmission engine are disabled when the computer system is booted. Next, respective state updating signals are issued in order from corresponding bus devices after a plurality of according links to the common transmission engine are established. Finally, an operating system of the computer system is loaded after all the bus devices are initialized.

Moreover, a method for initializing a first bus device and a second bus device sharing a common transmission engine of a bus used in a computer system according to the present invention is disclosed. The method includes the following step. At first, a first link of the first bus device to the common transmission engine is enabled while a second link of the second bus device to the common transmission engine is disabled. Next, a first state updating signal is transmitted from the first bus device to the computer system for initializing the first bus device. Finally, a data indicating a state of the bus is checked after the first state updating signal is transmitted. Sequentially, the second link of the second bus device to the common transmission engine is enabled when the data inform the computer system that the bus is not busy. And then, a second state updating signal is transmitted from the second bus device to the computer system for initializing the second bus device.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
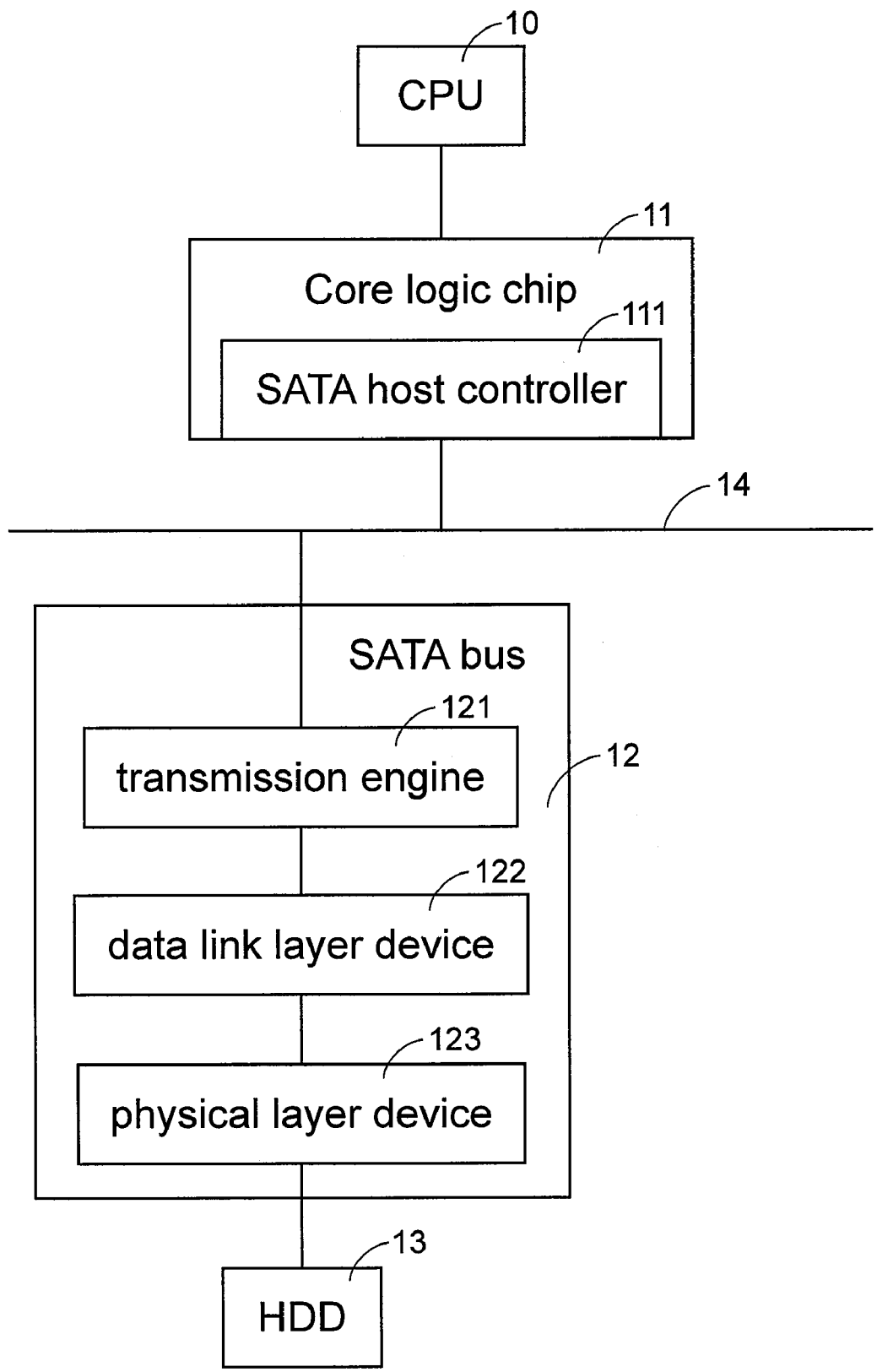
FIG. 1 is a functional block diagram of a SATA bus system with a single bus device.
Figure 2:
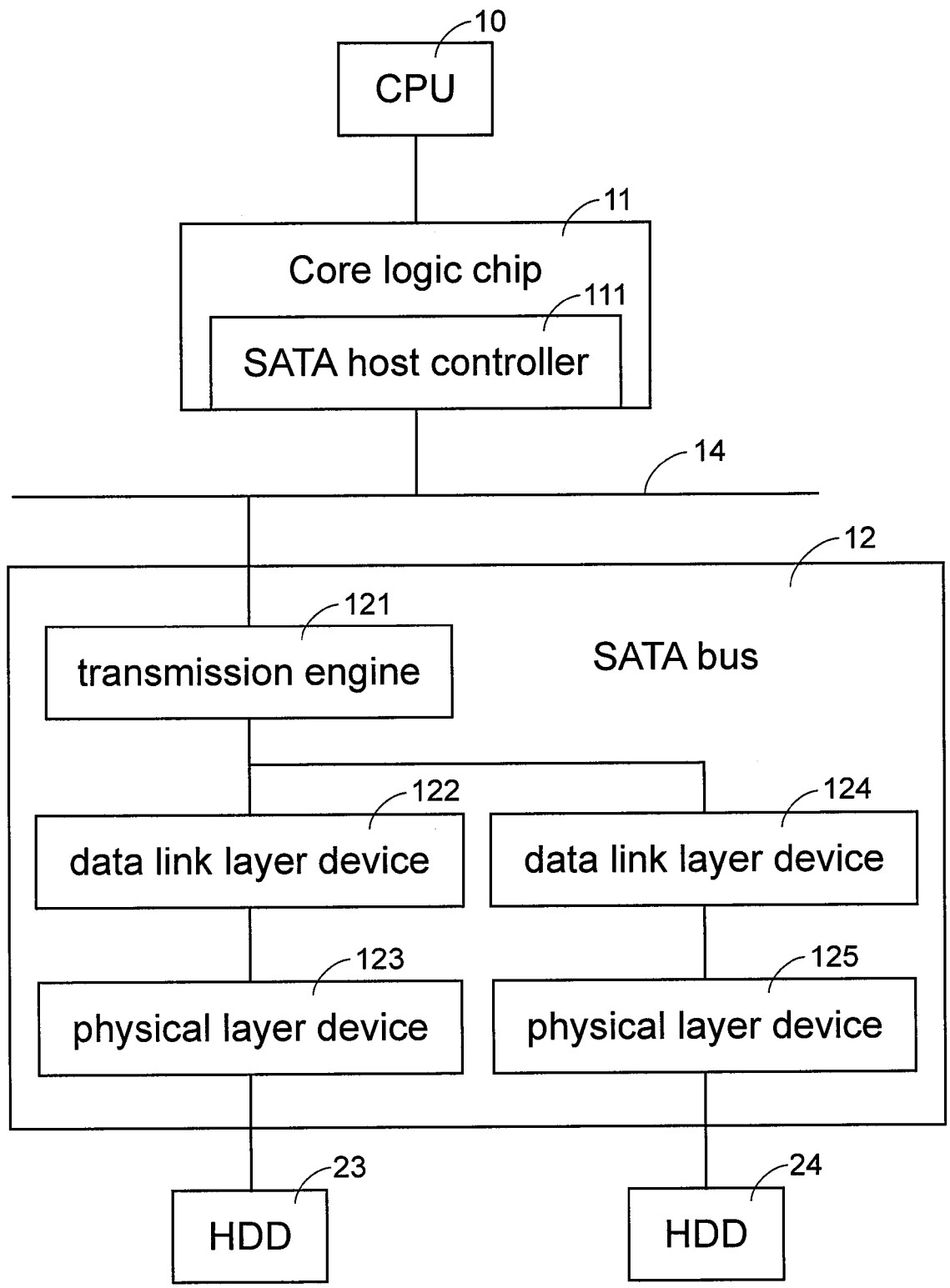
FIG. 2 is a functional block diagram of another SATA bus system with two bus devices sharing a common transmission engine.
Figure 3:
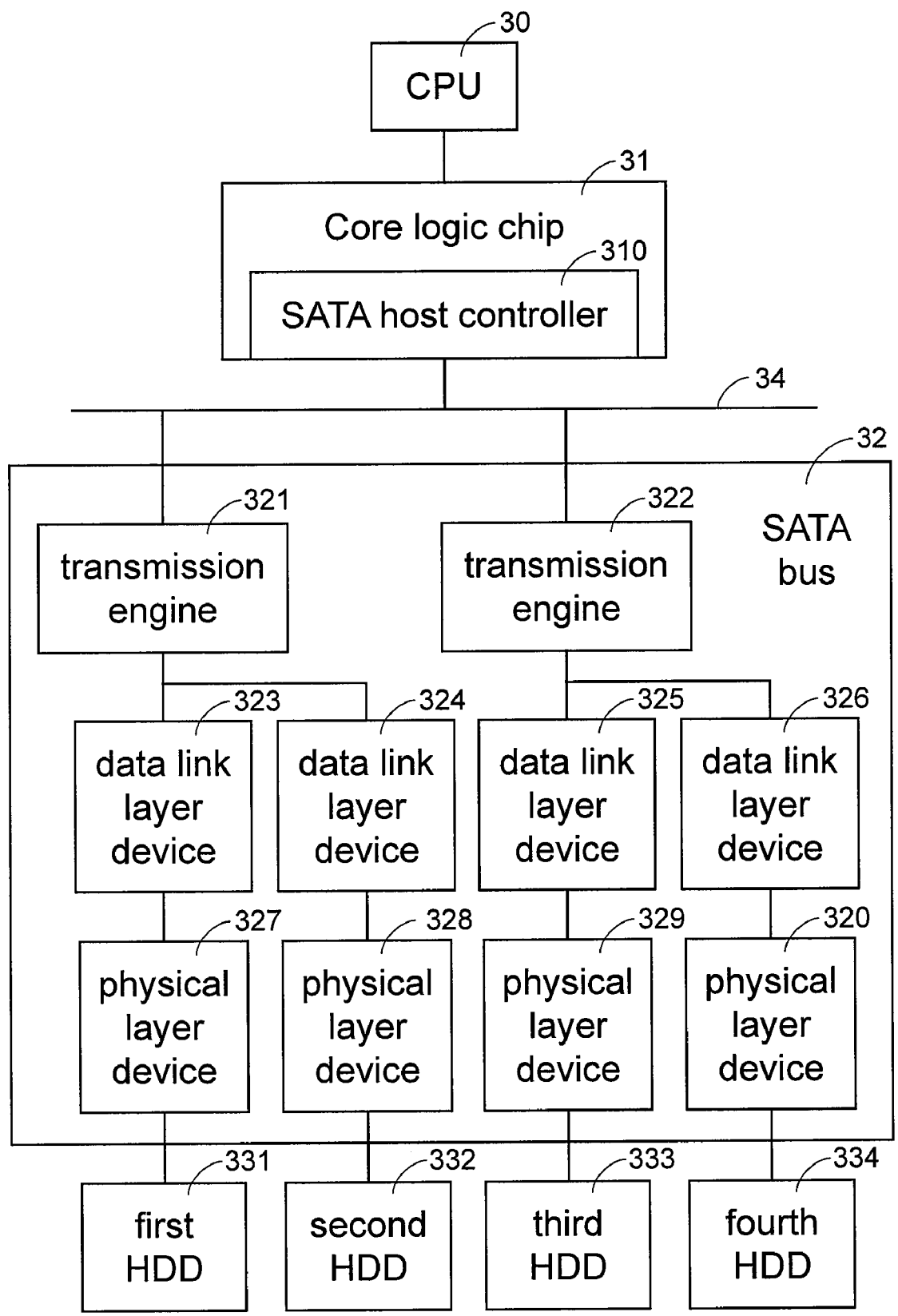
FIG. 3 is a functional block diagram of a further SATA bus system with plural bus devices sharing common transmission engines.

The bus-device initializing method according to the present invention is applicable to various computer architectures with more than one bus devices sharing a common transmission engine. FIG. 3 exemplifies a computer system 3 including two transmission engines, each serving two HDDs, to illustrate the present invention. As shown in FIG. 3, a first HDD 331, a second HDD 332, a third HDD 333 and a fourth HDD 334 are coupled to a core logic chip 31 and a CPU 30 via a SATA bus 32. The SATA bus 32 includes physical layer devices 327, 328, 329 and 320, data link layer devices 323, 324, 325 and 326, a first transmission engine 321 and a second transmission engine 322. The first transmission engine 321 serves the first HDD 331 and the second HDD 332, while the second transmission engine 322 serves the third HDD 333 and the fourth HDD 334. In addition, a SATA host controller 310 is disposed in the core logic chip 31 to control the SATA bus and bus devices via a SATA host controller interface 34.

Figure 4:
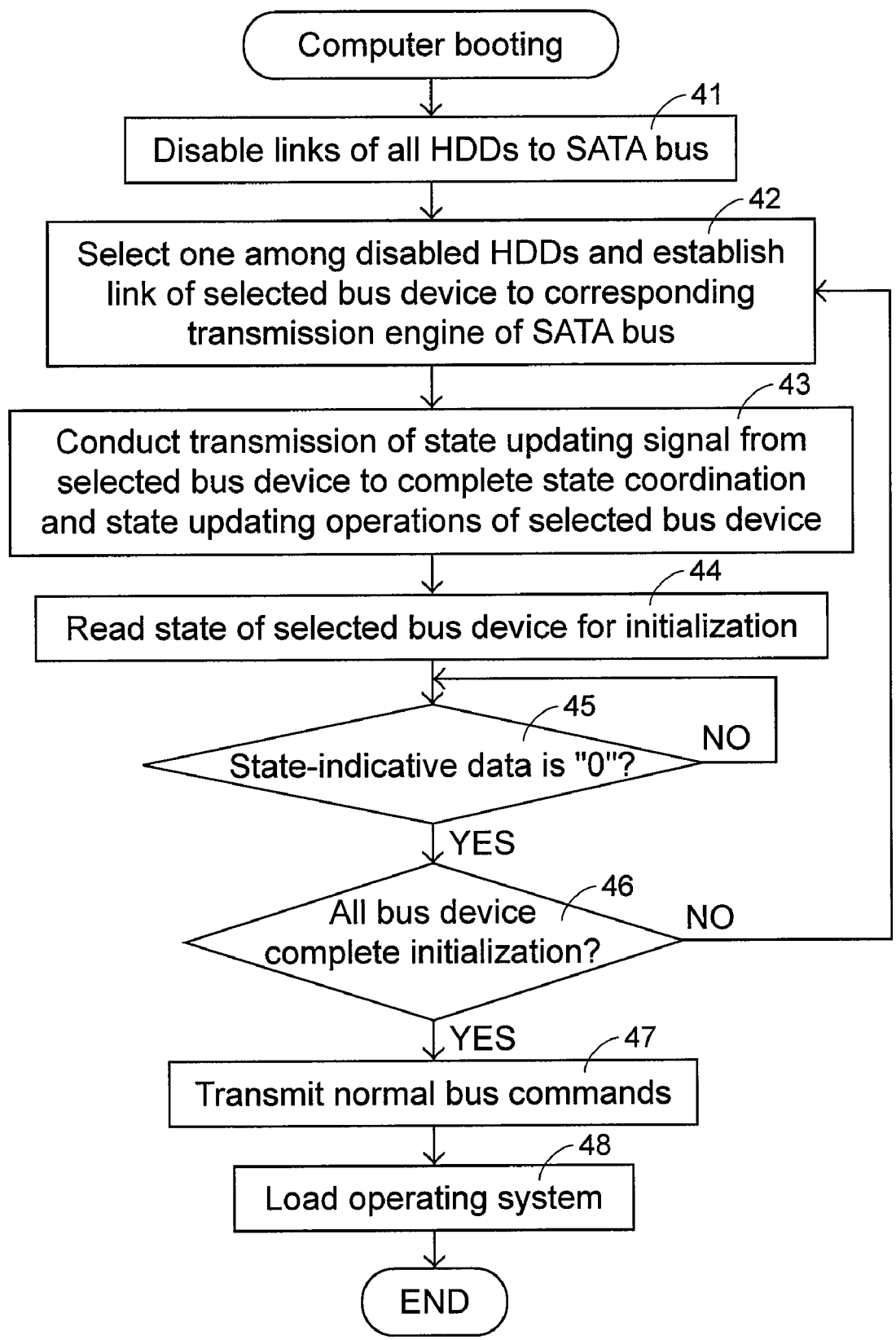
FIG. 4 is a flowchart of a bus-device initializing method according to an embodiment of the method of the invention.

An embodiment of the bus-device initializing method according to the present invention will be described hereinafter with the example of FIG. 3 and the flowchart of FIG. 4. When the computer system is booted, the SATA host controller 310 disables the linking operations of all the first HDD 331, the second HDD 332, the third HDD 333 and the fourth HDD 334 at first (Step 41). Then, a first link of a first bus device to a common transmission engine is established, wherein the first bus device is selected from one of the first HDD 331, the second HDD 332, the third HDD 333 and the fourth HDD 334, and the common transmission engine is correspondingly selected from one of the transmission engines 321 and 322 of the SATA bus 32 (Step 42). Under this circumstance, only a first state updating signal issued from the first bus device can be transmitted to the SATA host controller 310 through the common transmission engine via corresponding physical layer device and data link layer device. After the computer system acknowledges the first state updating signal, the first bus device completes state coordination and state updating operations (Step 43). Then, the state of the first bus device is read for initialization (Step 44). Afterwards, a specific data stored in a state register (not shown) to indicate the state of the SATA bus 32 is checked. If the specific data is a certain bit value, e.g. BSY bit=0, it means that the SATA bus 32 is not busy and the first state updating signal from the first bus device has been successfully transmitted by the SATA bus 32 for initializing the first bus device. Subsequently, by initializing a second bus device, a second link of the second bus device, which is different from the first bus device, to a common transmission engine is established, wherein the second bus device is selected from one of the first HDD 331, the second HDD 332, the third HDD 333 and the fourth HDD 334, and the common transmission engine is correspondingly selected from one of the transmission engines 321 and 322 of the SATA bus 42 (Step 45). Likewise, only a second state updating signal issued from the second bus device can be transmitted to the SATA host controller 310 through the common transmission engine via corresponding physical layer device and data link layer device. The data stored in the state register is checked again and next initializing step is performed for the second bus device through the common transmission engine when the data is the bit value "0" indicating that the SATA bus 32 is not busy (BSY bit=0). In this manner, all the HDDs can be initialized one by one.

For example, the first HDD 331 is first initialized by establishing the link of the first HDD 331 to the SATA bus 32 while keeping the links of the second HDD 332, the third HDD 333 and the fourth HDD 334 disabled so that the state updating signal from the first HDD 331 can be transmitted to the SATA host controller 310 via the physical layer device 327, data link layer device 323 and transmission engine 321. Then the state-indicative data is checked to determine whether the state updating signal has been successfully transmitted. If yes, it is the turn to initialize the second HDD 332 by establishing the link of the second HDD 332 to the SATA bus 32 while keeping the links of the third HDD 333 and the fourth HDD 334 disabled so that the state updating signal from the second HDD 332 can be transmitted to the SATA host controller 310 via the physical layer device 328, data link layer device 324 and transmission engine 321. Then the state-indicative data is checked to determine whether the state updating signal has been successfully transmitted. If yes, it is the turn to initialize the third HDD 333 by establishing the link of the third HDD 333 to the SATA bus 32 while keeping the link of the fourth HDD 334 disabled so that the state updating signal from the third HDD 333 can be transmitted to the SATA host controller 310 via the physical layer device 329, data link layer device 325 and transmission engine 322. Finally, after the state-indicative data indicates the transmission of the state updating signal has completed, the link of the fourth HDD 334 to the SATA bus 32 is established, and the state updating signal from the fourth HDD 334 can be transmitted to the SATA host controller 310 via the physical layer device 320, data link layer device 326 and transmission engine 322, thereby initializing the fourth HDD 334.

After all the bus devices have been initialized successfully (Step 46), bus commands can be transmitted normally (Step 47), and the operating system and subsequent programs can be loaded and executed (Step 48).

According to the present invention, all the bus devices are disabled in the beginning. The disabling effect, for example, can be achieved by enabling respective staggered spin-up commands having been defined in the SATA specifications. Subsequently, the staggered spin-up commands are disabled to establish the links, respectively. Aside from, there could be alternative ways to disable and establish the link. For example, the hardware of the HDD can be designed to do no active linking operation. The linking operation is then performed in response to a software command.

Although the embodiment of the present invention is exemplified as above with HDDs serving as bus devices coupled to the SATA bus, the present initializing method can also be applied to any other suitable bus device(s), e.g. optical disc drive, coupled to a SATA (Serial Advanced Technology Attachment) bus, an ATA (Advanced Technology Attachment) bus or an ATAPI (Advanced Technology Attachment Packet Interface) bus. By using the present method, the bus devices can be initialized normally.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for initializing a first bus device and a second bus device sharing a common transmission engine of a bus, for use in a computer system coupled thereto the first bus device and the second bus device via the bus and the common transmission engine, the method comprising steps of:
    disabling a first link of the first bus device and a second link of the second bus device to the common transmission engine when the computer system is booted;
    establishing the first link to the common transmission engine;
    issuing a first state updating signal from the first bus device for initializing the first bus device after the first link to the common transmission engine is established;
    establishing the second link to the common transmission engine after the first state updating signal is issued and then received by the computer system to update a state of the first bus device; and
    issuing a second state updating signal from the second bus device for initializing the second bus device after the second link to the common transmission engine is established.

2. The method according to claim 1, wherein the first and second bus devices are SATA (Serial Advanced Technology Attachment) bus devices and the common transmission engine is a SATA transmission engine.

3. The method according to claim 2, wherein the SATA bus devices are SATA HDDs (hard disc drives).

4. The method according to claim 2, wherein a staggered spin-up command is enabled under SATA protocol to disable the first link and the second link to the common transmission engine.

5. The method according to claim 2, wherein a staggered spin-up command is disabled under SATA protocol to establish one of the first link and the second link to the common transmission engine.

6. The method according to claim 1, further comprising:
checking a data indicating a state of the bus after the transmission of the first state updating signal; and
establishing the second link to the common transmission engine when the bit value of the state is a specific value.

7. The method according to claim 1, further comprising steps of:
transmitting a normal bus command following both of the first state updating signal and the second state updating signal; and
loading an operating system after both of the first bus device and the second bus device are initialized.

8. A method for initializing a plurality of bus devices sharing a common transmission engine of a bus in a computer system, comprising steps of:
disabling all the links of the bus devices to the common transmission engine when the computer system is booted;
establishing corresponding links of the bus devices to the common transmission engine in sequence and issuing respective state updating signals from corresponding bus devices to the computer system to update states of the bus devices for initializing the bus devices in sequence in an established order of corresponding links to the common transmission engine; and
loading an operating system of the computer system after all the bus devices are initialized.

9. The method according to claim 8 wherein the bus is a SATA (Serial Advanced Technology Attachment) bus.

10. The method according to claim 9, wherein a staggered spin-up command is enabled under SATA protocol to disable each according links to the common transmission engine.

11. The method according to claim 9, wherein a staggered spin-up command is disabled under SATA protocol to establish each of the according links to the common transmission engine.

12. The method according to claim 8, wherein a next state updating signal is issued from a next bus device after a former state updating signal is received and a next link of the next bus device to the common transmission engine is established.

13. The method according to claim 12, wherein the former state updating signal is regarded as having been received when data stored in a state register indicates a state of the bus is not busy.

14. A method for initializing a first bus device and a second bus device sharing a common transmission engine of a bus in a computer system, comprising steps of:
enabling a first link of the first bus device to the common transmission engine while disabling a second link of the second bus device to the common transmission engine when the computer system is booted;
transmitting a first state updating signal from the first bus device to the computer system for initializing the first bus device;
checking a data indicating a state of the bus after transmitting the first state updating signal;
enabling the second link of the second bus device to the common transmission engine when it is indicated that the first state updating signal has been received by the computer system, and the bus is not busy according to the data; and transmitting a second state updating signal from the second bus device to the computer system for initializing the second bus device.

15. The method according to claim 14 wherein links of the first bus device and the second bus device to the transmission engine are preset to be inactive when the computer system is booted, and the first link of the first bus device to the common transmission engine is enabled by a software command of the computer system.

16. The method according to claim 14 wherein the first and second bus devices are SATA (Serial Advanced Technology Attachment) bus devices and the common transmission engine is a SATA transmission engine.

17. The method according to claim 16 wherein the SATA bus devices are SATA HDDs (hard disc drives).

18. The method according to claim 16 wherein a staggered spin-up command under SATA protocol is enabled to disable the first link and the second link to the common transmission engine.

19. The method according to claim 16 wherein a staggered spin-up command under SATA protocol is disabled to enable one of the first link and the second link to the common transmission engine.

20. The method according to claim 14, further comprising steps of:
transmitting a normal bus command after both of the first state updating signal and the second state updating signal are received; and
loading an operating system after both of the first bus device and the second bus device are initialized.

* * * * *